United States Patent
Pasta et al.

[19]

[11] Patent Number: 5,261,021
[45] Date of Patent: Nov. 9, 1993

[54] APPARATUS AND METHOD FOR FORMING CABLE

[75] Inventors: Joseph Pasta, Milton; Richard C. Smith, St. Thomas; Jeffrey W. Budd, Thornhill, all of Canada

[73] Assignee: Nordson Corporation, Westlake, Ohio

[21] Appl. No.: 866,908

[22] Filed: Apr. 10, 1992

[51] Int. Cl.⁵ .................................................. G02B 6/44
[52] U.S. Cl. ..................................... 385/100; 385/101; 174/23 R
[58] Field of Search .............. 385/100, 101, 102, 103; 174/107, 23 R

[56] References Cited

U.S. PATENT DOCUMENTS

| | | | |
|---|---|---|---|
| Re. 33,481 | 12/1990 | Ziecker | 239/298 |
| 3,766,307 | 10/1973 | Andrews, Jr. | 385/101 X |
| 4,365,865 | 12/1982 | Stiles | 385/103 X |
| 4,600,603 | 7/1986 | Mulder | 427/180 |
| 4,605,818 | 8/1986 | Arroyo et al. | 174/107 |
| 4,675,209 | 6/1987 | Pedigrew | 427/194 |
| 4,815,813 | 3/1989 | Arroyo et al. | 385/102 |
| 5,002,229 | 3/1991 | Schneider et al. | 239/427.5 |
| 5,010,209 | 4/1991 | Marciano-Agostinelli et al. | 174/23 C |

OTHER PUBLICATIONS

Nordson Application Bulletin No. A645 having a copyright date of Oct. 1988.

*Primary Examiner*—John D. Lee
*Assistant Examiner*—Phan T. Heartney
*Attorney, Agent, or Firm*—Tarolli, Sundheim & Covell

[57] ABSTRACT

A cable, which may be a fiber optic cable, includes a plurality of conductors which are twisted together. A tape with a layer of superabsorbent powder thereon, is wrapped around the conductors. A sheath is formed around the outside of the tape. If a leak should occur, the superabsorbent powder absorbs moisture and expands to block further entry of moisture into the cable. The tape is formed by applying a layer of adhesive to a strip of flexible material. The adhesive is advantageously applied in a helical pattern which is spaced from longitudinal edges of the tape. The superabsorbent powder is then applied to the adhesive. A suction head removes excess superabsorbent powder from the tape. The tape is then wrapped around the conductors of the cable. The adhesive may be a sealant material which is applied to the conductors before they are wrapped with the tape.

45 Claims, 1 Drawing Sheet

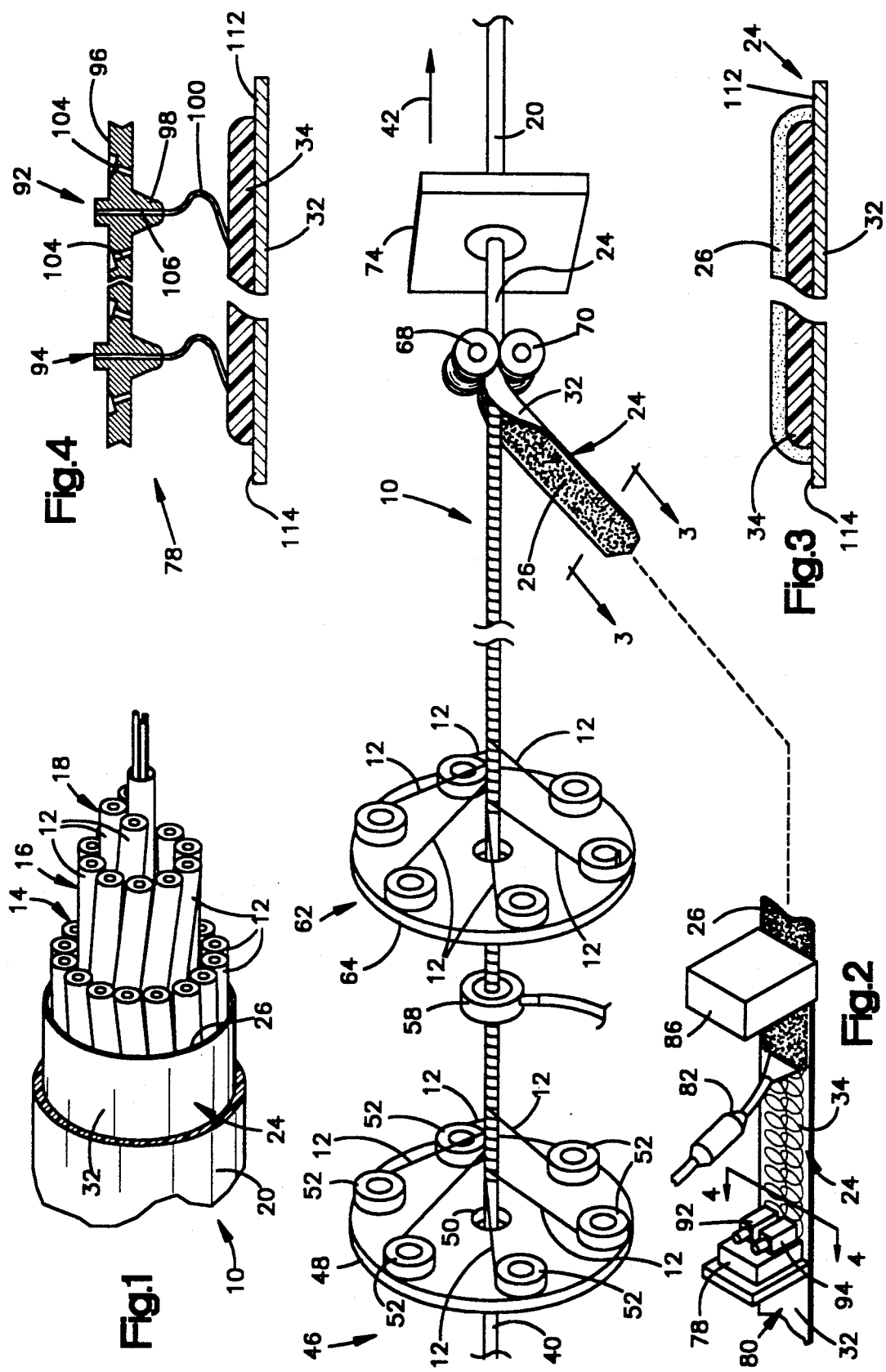

APPARATUS AND METHOD FOR FORMING CABLE

BACKGROUND OF THE INVENTION

The present invention provides a new and improved method and apparatus for forming an improved cable.

Fiber optic cables have previously been manufactured by a process which involves twisting successive layers of glass fibers around a core. A moisture barrier may be formed by applying a coating of a grease-like sealant, over the glass fibers. A shield of corrugated metal tape is wrapped around the sealant coated glass fibers. The cable is then covered with a water impervious sheath. The sheath may be applied by extruding a polymer material around the outside of the cable.

In order to resist moisture flow along the cable in the event of a cut or break in the sheath, a swelling tape is wrapped around the glass fibers before the outer sheath is extruded around the cable. This swelling tape is a fibrous material that has some superabsorbent powder entangled in the fibers. A test that may be run to determine the ability of the cable to resist the permeation of moisture involves cutting the sheath and immersing the cable in water for 24 hours. If the water does not permeate any further than one foot from the cut, the barrier is considered to be adequate The addition of the swelling tape is relatively expensive.

It has been suggested that the superabsorbent material be mixed in the grease-like sealant which is applied to the glass fibers. The amount of superabsorbent material mixed in the sealant and the extent to which the sealant and superabsorbent material must be mixed is subjective and subject to human error. This may result in the use of excessive superabsorbent material and/or uneven mixing of the superabsorbent material with the sealant.

SUMMARY OF THE INVENTION

The present invention relates to a new and improved apparatus and method for use in forming an improved cable which contains a plurality of conductors. During forming of the cable, a layer of superabsorbent material is applied to a tape. The tape is wrapped around the conductors with the superabsorbent material on the tape.

The tape may be formed from a flexible strip of material to which a layer of adhesive is applied. The layer of superabsorbent material is applied to the layer of adhesive. The layer of adhesive may be applied to the flexible strip in a helical pattern. Application of the adhesive in a helical pattern facilitates application of the adhesive to the flexible strip with the adhesive spaced from a longitudinally extending edge portion of the flexible strip.

BRIEF DESCRIPTION OF THE DRAWINGS

The foregoing and other features of the invention will become more apparent upon a consideration of the following description taken in connection with the accompanying drawings, wherein:

FIG. 1 is a fragmentary illustration of a cable;

FIG. 2 is a schematic illustration depicting the manner in which the cable of FIG. 1 is formed;

FIG. 3 is an enlarged schematic fragmentary sectional view, taken generally along the line 3—3 of FIG. 2, schematically illustrating the manner in which a layer of superabsorbent powder is disposed on a tape prior to application of the tape to the cable during forming of the cable; and FIG. 4 is an enlarged schematic illustration, taken generally along the line 4—4 of FIG. 2, schematically depicting the manner in which adhesive is applied to a flexible strip to form the tape.

DESCRIPTION OF A SPECIFIC PREFERRED EMBODIMENT OF THE INVENTION

The Cable

An improved cable 10 is illustrated in FIG. 1. The cable 10 includes a plurality of conductors 12 which are twisted together to form layers 14, 16 and 18. A water impervious protective sheath 20 extends around the outside of the layers 14, 16 and 18 of conductors 12.

In accordance with a feature of the present invention, a tape 24 with a layer 26 of superabsorbent material thereon, is disposed between the sheath 20 (FIG. 1) and the outer layer 14 of conductors 12. If water happens to leak through a cut or other discontinuity in the sheath 20, the layer 26 of superabsorbent material absorbs the water and expands. Expansion of even a portion of the layer 26 of superabsorbent material blocks further leakage of water into the cable 10.

In the illustrated embodiment of the invention, the cable 10 is an optical fiber cable. Thus, in the cable 10, the conductors 12 are glass fibers through which light is conducted in a known manner. However, it is contemplated that the present invention may be used with cables other than optical fiber cables. For example, the conductors 12 could be wires which conduct electrical energy.

The tape 24 is a flexible corrugated metal tape. Thus, the tape 24 includes a flexible corrugated metal strip 32. Since the strip 32 is formed of metal, it protects the conductors 12. Relatively small corrugations in the strip 32 extend circumferentially around the outer layer 14 of conductors 12 and enable the strip 32 to flex during installation of the cable 10. The strip 32 could be formed of a different material if desired. Thus, the strip 32 could be formed of a fabric or a nonporous polymeric sheet.

A layer 34 of adhesive, illustrated schematically in FIG. 3, is disposed on the corrugated metal strip 32. The layer 34 of adhesive secures the layer 26 of superabsorbent material to the corrugated metal strip 32. The layer 34 of adhesive may be formed of many different materials. Thus, the layer 34 of adhesive may be formed of a grease-like sealing compound or a hot melt material.

The layer 26 of superabsorbent material, illustrated schematically in FIG. 3, is preferably formed of a powder. The superabsorbent powder forms a continuous layer 26 on the layer 34 of adhesive. The layer 34 of adhesive secures the superabsorbent powder to the corrugated metal strip 32 to hold the powder in place during fabrication of the cable 10. This results in a uniform layer 26 of superabsorbent powder extending throughout the length of the tape 24 to provide substantially uniform moisture absorbing capability throughout the length of the cable 10. If desired, the superabsorbent material could be in a form other than a powder. For example, the superabsorbent material could be in a fibrous form.

The sheath 20 (FIG. 1) is formed of an extruded polymeric material. The sheath 20 is extruded over the tape 24 and is free of joints or discontinuities where leaks may tend to form. The polymeric material of the continuous sheath 20 is impervious to water to prevent moisture from seeping into the cable when the cable is exposed to water.

In the event that there is some leakage of water into the cable 10 due to a cutting of the sheath 20 or the formation of a discontinuity in the sheath in some other manner, the layer 26 of superabsorbent powder will expand to block leakage of moisture into the cable. In addition, the optical fibers forming the conductors 12 (FIG. 1) are coated with a sealant which forms a moisture barrier. The sealant may be a grease or thermoplastic material. In one specific embodiment of the invention, the sealant was a grease-like material which is commercially available from Dussek Campbell Ltd. of Belleville, Ontario, Canada under the designation TC-5116 Telecom Cable Flooding Compound.

The layer 34 of adhesive, illustrated schematically in FIG. 3, is advantageously formed of the same grease-like material which is used as a sealant around the optical fibers forming the conductors 12. This enables the adhesive 34 to also function as a sealant to retard exposure of the conductors 12 to moisture. The layer 26 of powder, illustrated schematically in FIG. 3, is pressed against the conductors 12 in the outer layer 14 by the sealant type adhesive 34 on the tape 24. The layer 26 of superabsorbent powder is also pressed against the sealant which fills spaces between the conductors 12. Although it is preferred to use the grease-like sealant material to form the layer 34 of adhesive, the layer of adhesive could be formed of a pressure sensitive hot melt material if desired.

Forming the Cable

The optical fiber cable 10 is formed in the manner illustrated schematically in FIG. 2. A core 40 of known construction is moved toward the right along its central axis, that is, in the direction of the arrow 42. As the core 40 is moved toward the right, optical fiber conductors 12 are wrapped around the core by a known apparatus 46.

The apparatus 46 includes a twister head 48 having a central opening 50 through which the core 40 extends. As the core 40 is moved toward the right (as viewed in FIG. 2), the twister head 48 is rotated about the central axis of the core. As the twister head 48 is rotated, optical fiber conductors 12 are fed from supply spools 52 disposed on the twister head 48. Due to the rotation of the twister head 48 about the axially moving core 40, the glass fibers forming the optical fiber conductors 12 are wrapped about the core in a known manner.

After a layer of conductors 12 has been wrapped around the core, a coating die 58 (FIG. 2) applies sealant to the layer of conductors. The sealant forms a moisture barrier which coats the conductors 12 and extends throughout the length of the cable 10. Although the coating die 58 may be used to apply many different types of sealant, the aforementioned grease-like material which is commercially available from Dussek Campbell Ltd. of Belleville, Ontario, Canada is the presently preferred sealant.

A second apparatus 62 has the same construction as the apparatus 46 and includes a twister head 64 which wraps conductors 12 around the layer of conductors applied to the core by the apparatus 46. A second coating die, having the same construction as the coating die 58, is provided to apply sealant to the second layer of the cable. The number of twister heads and coating dies utilized to form a cable 10 will depend upon the number of layers of conductors to be provided in the cable. Apparatus similar to the apparatus 46 and 62 can be used to form other types of cables, for example, electrical cables.

Once the desired number of layers of conductors 12 have been wrapped around the core 40 and sealant applied to the various layers, the tape 24 is wrapped around the conductors 12. The tape 24 is wrapped around the conductors 12 with a longitudinal seam extending parallel to the longitudinal central axis of the core 40. Thus, the tape 24 is moved upwardly (as viewed in FIG. 2) toward the cable 10 and is wrapped longitudinally around the cable with the layer 26 of superabsorbent powder facing inwardly toward the layers of optical fiber conductors 12. If desired, the tape 24 could be helically wrapped around the cable.

A plurality of rollers 68 and 70 apply pressure against the outer surface of the corrugated metal strip 32 of the tape 24. The layer 26 of superabsorbent powder is pressed against the conductors 12 and the sealant disposed around the conductors. The width of the tape 24 is such that the opposite longitudinally extending edges of the tape are positioned in overlapping engagement with each other by the rollers 68 and 70. This results in the cable 10 being completely enclosed by the tape 24 and layer 26 of superabsorbent powder. Since the layer 26 of superabsorbent powder has a uniform thickness along the tape 24, uniform protection against moisture is provided throughout the length of the cable 10.

Once the tape 24 has been wrapped around the cable 10, the cable passes through an extrusion die 74 (FIG. 2). As the cable 10 passes through the extrusion die 74, polymeric material is extruded around the tape 24 to form the sheath 20. Thus, the sheath 20 is extruded as a seamless tube which extends around the tape 24 and layers of conductors 12 forming the cable 10. The sheath 20 is formed of a tough water impervious material which is resistant to the formation of discontinuities. However, if a discontinuity should occur due to a cutting of the sheath 20 or other cause, the superabsorbent powder in the layer 26 will expand to block permeation of moisture along the cable 10.

To form the tape 24 with the layer 26 of superabsorbent powder on the tape, the flexible strip 32 of corrugated metal is moved past an adhesive applicator assembly 78 (FIG. 2). The adhesive applicator assembly 78 applies adhesive to an upwardly facing major side surface 80 of the corrugated metal strip 32. The corrugations in the metal strip 32 extend perpendicular to the longitudinal axis of the strip and have an amplitude of approximately 1/32 of an inch. Although the adhesive applicator assembly 78 may be used to apply many different types of known adhesives to the strip 32, the aforementioned grease-like sealant material which is commercially available from Dussek Campbell Ltd. of Belleville, Ontario, Canada is the presently preferred adhesive.

After the layer 34 of adhesive has been applied to the strip 32 by the adhesive applicator assembly 78, the layer 26 of superabsorbent material is applied to the adhesive. Thus, a powder applicator assembly 82 applies a superabsorbent powder to the layer 34 of adhesive o the tape 24 in a continuous layer 26 (FIG. 3) having a substantially uniform thickness of approximately 0.001 of an inch or an add-on weight of 10 to 20 grams per square meter. The layer 26 of superabsorbent powder is secured to the flexible strip 32 by the adhesive layer 34.

Excess superabsorbent powder is removed from the tape 24 and recycled. Thus, a suction head 86 exposes the upper side of the tape 24 to relatively low pressure. This results in any excess superabsorbent powder on the tape 24 being drawn or sucked up into the suction head 86. The excess superabsorbent powder is returned from the suction head 86 to the powder applicator assembly 82 for subsequent application to the tape 24.

The adhesive applicator assembly 78 has a known construction and applies a continuous layer of adhesive to the strip 32. The adhesive applicator assembly 78 directs the adhesive onto a longitudinally extending central portion of the strip 32 in a compact open pattern of a desired width. To provide for the formation of a pattern of the desired width, the adhesive applicator assembly 78 includes a pair of spray guns 92 and 94 which apply the adhesive in helical patterns. Other open patterns could be utilized if desired.

Each of the spray guns 92 and 94 is constructed in the manner disclosed in U.S. Reissue Patent No. 33,481, issued on Dec. 11, 1990 as a reissue of U.S. Pat. No. 4,785,996 issued Nov. 22, 1988 and entitled "Adhesive Spray Gun and Nozzle Attachment". With larger diameter cables, the width of the strip 32 may be such as to require more than a pair of spray guns 92 and 94 to apply the adhesive. For example, eight spray guns having the same construction as the spray guns 92 and 94 could be used to apply adhesive to a strip which is wider than the strip 32.

The spray gun 92 has a nozzle attachment 96, illustrated schematically in FIG. 4. The grease-like adhesive is discharged through a nozzle tip 98 to form an adhesive bead 100. At the same time the adhesive bead 100 is formed and ejected from the nozzle attachment 96, pressurized air is directed from an air inlet line (not shown) to a plurality of air jet bores 104 formed in the nozzle attachment 96.

The air jet bores 104 (FIG. 4) are angled relative to the longitudinal axis of a through-bore 106 in the nozzle tip 98 so that the jets of air flowing therethrough impact the adhesive bead 100 substantially tangent to its outer periphery at a point spaced below the nozzle tip 98. The air ejected from the air jet bores 104 performs two functions. First, the jets of air attenuate or stretch the adhesive bead 100 forming elongated strands of adhesive for deposit onto the corrugated metal strip 32. Additionally, since the air jet bores 104 are oriented to direct jets of air tangent to the outer periphery of the adhesive bead 100, the adhesive bead is rotated in a compact helical path toward the strip 32 in the manner illustrated schematically in FIG. 4. As a result, a controlled open helical pattern of adhesive having a desired pattern width is obtained on the corrugated metal strip 32. As was previously mentioned, additional spray guns may be utilized to apply adhesive to strips which are wider than the strip 32.

The spray gun 94 has the same construction as the spray gun 92. The two spray guns 92 and 94 apply the adhesive to the corrugated metal strip 32 in a pair of overlapping helical patterns. The combined width of the two helical patterns of adhesive can be accurately controlled to control the width of the layer 34 of adhesive applied to the strip 32.

The layer 34 of adhesive is spaced from longitudinally extending edge portions 112 and 114 (FIGS. 3 and 4) of the corrugated metal strip 32. Therefore, the edge portions 112 and 114 of the corrugated metal strip 32 are free of adhesive. This enables the edge portions 112 and 114 of the strip 32 to be pressed into overlapping abutting engagement by the rollers 68 and 70 (FIG. 2) as the tape 24 is wrapped around the cable 10. Having the edge portions 112 and 114 of the strip free of adhesive tends to minimize the amount of adhesive to which the rollers 68 and 70, extrusion die 74, and other components of the cable fabricating equipment are exposed.

It is preferred to use the two spray guns 92 and 94 to apply the adhesive in a pair of overlapping open helical patterns in order to control the width of the longitudinally extending layer 34 of adhesive applied to the strip 32. However, a single spray gun 92 or 94 or more than two spray guns could be used if desired. Other known types of adhesive applicators could be utilized if desired to apply the adhesive in a fibrous deposition which may be an open pattern or a continuous mat. For example, a slot spray device or an atomizing spray gun could be utilized to apply the layer of adhesive. However, it is presently believed that the use of a spray gun which applies the adhesive in an open helical pattern is preferable in order to obtain accurate placement of the adhesive on the corrugated metal strip 32.

It is contemplated that the adhesive could be applied with a pattern other than an overlapping helical pattern. For example, a fibrous mat or open web pattern of attenuated and randomly deposited fibers of hot melt adhesive could be deposited on strip 32.

The superabsorbent powder applicator assembly 82 applies a continuous even layer 26 of superabsorbent powder onto the layer 34 of adhesive. It is presently preferred to have the superabsorbent applicator assembly 82 constructed in the manner disclosed in U.S. Pat. No. 4,600,603, issued Jul. 15, 1986 and entitled "Powder Spray Apparatus and Powder Spray Method" and in U.S. Pat. No. 5,002,229, issued Mar. 26, 1991 and entitled "Powder Spray Gun". However, it should be understood that other known types of powder applicator devices could be utilized to apply the layer 26 of superabsorbent powder to the tape 24.

The superabsorbent material applied to the tape 24 is preferably a powder which is commercially available from Arco Chemical having a place of business at 1500 Market St., Philadelphia, U.S.A. However, other known superabsorbent materials could be utilized if desired. For example, fibers of superabsorbent material could be utilized to form the layer 26.

The superabsorbent powder forming the layer 26 can absorb many times its weight in water. Thus, the superabsorbent powder forming the layer 26 can absorb from 200 to 1,000 times its weight in water. The superabsorbent powder preferably absorbs between 500 and 1,000 times its weight in water.

The suction head 86 applies suction to the layer 26 of superabsorbent powder in the manner disclosed in U.S. Pat. No. 4,675,209, issued Jun. 23, 1987 and entitled "Process and Device for the Application of a High-Active Absorber on a Substrate". Of course, the suction head 86 could have a different construction if desired. In fact, the suction head 86 may be omitted if the use of excess superabsorbent powder is not objectionable.

Conclusion

In view of the foregoing description, it is apparent that the present invention provides a new and improved apparatus and method for forming an improved cable 10 which contains a plurality of conductors 12. During forming of the cable 10, a layer 26 of superabsorbent material is applied to a tape 24. The tape 24 is wrapped around the conductors 12 with the superabsorbent material on the tape.

The tape 24 may be formed from a flexible strip 32 of material to which a layer 34 of adhesive is applied. The layer 26 of superabsorbent material is applied to the layer 34 of adhesive. The layer 34 of adhesive may be applied to the flexible strip 32 in a helical pattern. Application of the adhesive in a helical pattern facilitates application of the adhesive to the flexible strip 32 with the adhesive spaced from a longitudinally extending edge portion 112 of the flexible strip and from the opposite longitudinally extending edge portion 114 of the flexible strip.

Having described the invention, the following is claimed:

1. An apparatus for use in forming a cable containing a plurality of conductors, said apparatus comprising means for applying a layer of adhesive to a flexible strip of material to form a tape, means for applying a layer of superabsorbent material to the tape, said means for applying the layer of superabsorbent material to the tape being operable to apply the layer of superabsorbent material to the layer of adhesive on the flexible strip of material, and means for wrapping the tape around the plurality of conductors with the superabsorbent material on the layer of adhesive on the flexible strip of material.

2. An apparatus as set forth in claim 1 further including means for providing an outer sheath over the tape.

3. An apparatus as set forth in claim 1 wherein said means for wrapping the tape around the plurality of conductors includes means for applying pressure against the tape to press the superabsorbent material against at least some of the conductors of the plurality of conductors.

4. An apparatus as set forth in claim 1 further including means for removing excess superabsorbent material from the tape.

5. An apparatus as set forth in claim 1 wherein said means for applying a layer of adhesive to the flexible strip of material includes means for applying the adhesive to a longitudinally extending central portion of the flexible strip of material and for leaving a longitudinally extending edge portion of the flexible strip of material free of adhesive.

6. An apparatus as set forth in claim 1 wherein the means for applying a layer of adhesive to the flexible strip of material includes applicator means for applying the adhesive to the flexible strip in a pattern which is spaced from longitudinally extending edge portions of the flexible strip.

7. An apparatus as set forth in claim 1 wherein the means for applying a layer of adhesive to the flexible strip of material includes applicator means for applying the adhesive to the flexible strip in a helical pattern which is spaced from longitudinally extending edge portions of the flexible strip.

8. An apparatus as set forth in claim 7 wherein said means for wrapping the tape around the plurality of conductors includes means for wrapping the tape around the plurality of conductors with the longitudinally extending edge portions of the flexible strip in an overlapping relationship.

9. An apparatus as set forth in claim 1 further including means for wrapping the tape and plurality of conductors in a sheath of water impervious material which extends around the tape.

10. An apparatus as set forth in claim 1 further including means for applying suction to the superabsorbent material on the tape to remove excess superabsorbent material from the tape.

11. An apparatus for use in forming a cable containing a plurality of conductors, said apparatus comprising means for applying a layer of adhesive to a flexible strip of material with the adhesive spaced from opposite longitudinally extending edge portions of the flexible strip of material so that the opposite longitudinally extending edge portions of the flexible strip of material are free of adhesive, powder applicator means for applying a layer of superabsorbent powder to the layer of adhesive, suction means for removing excess powder from the layer of adhesive, means for applying a layer of sealant to the conductors, means for wrapping the flexible strip of material around the plurality of conductors with the layer of superabsorbent material on the flexible strip of material in engagement with the layer of sealant applied to the conductors, said means for wrapping the flexible strip of material around the plurality of conductors including means for wrapping the flexible strip of material around the plurality of conductors with the longitudinally extending and adhesive free edge portions of the flexible strip of material in an overlapping relationship, and means for applying a sheath of water impervious material over the flexible strip of material.

12. An apparatus as set forth in claim 11 wherein said means for applying a layer of adhesive to a flexible strip of material includes means for applying the adhesive to the flexible strip of material in a helical pattern which is spaced from the longitudinally extending edge portions of the flexible strip of material.

13. An apparatus for use in forming a cable containing a plurality of conductors, said apparatus comprising means for applying a sealing material to the plurality of conductors, means for applying a layer of the sealing material to a flexible strip of material to form a tape, means for applying a layer of superabsorbent material to the tape, said means for applying the layer of superabsorbent material to the tape being operable to apply the layer of superabsorbent material to the layer of sealing material on the flexible strip of material, and means for wrapping the tape around the plurality of conductors with the superabsorbent material on the tape.

14. An apparatus as set forth in claim 13 wherein said means for wrapping the tape around the plurality of conductors includes means for positioning at least some of the superabsorbent material on the tape in engagement with sealing material applied to the conductors.

15. An apparatus as set forth in claim 13 wherein said means for applying a layer of the sealing material to the flexible strip includes applicator means for applying the sealing material to the flexible strip with the sealing material spaced from longitudinally extending edge portions of the flexible strip.

16. An apparatus as set forth in claim 15 wherein said means for wrapping the tape around the plurality of conductors includes means for wrapping the tape around the plurality of conductors with the longitudinally extending edge portions of the flexible strip in an overlapping relationship.

17. An apparatus as set forth in claim 13 further including means for applying suction to the superabsorbent material on the tape to remove excess superabsorbent material from the tape.

18. An apparatus as set forth in claim 13 wherein said means for applying sealing material to the flexible strip includes means for applying sealing material to the flexible strip in a helical pattern which is spaced from longitudinally extending edge portions of the flexible strip.

19. A method of forming a cable containing a plurality of conductors, said method comprising the steps of applying a layer of adhesive to a flexible strip of material to form a tape, applying a layer of superabsorbent material to the tape, said step of applying a layer of superabsorbent material to the tape including applying the layer of superabsorbent material to the layer of adhesive on the flexible strip of material, and wrapping the tape around the plurality of conductors with the superabsorbent material on the layer of adhesive on the flexible strip of material.

20. A method as set forth in claim 19 further including the step of applying a sheath over the tape after performing said step of wrapping the tape around the plurality of conductors.

21. A method as set forth in claim 19 wherein said step of applying a layer of adhesive to the flexible strip of material includes applying adhesive to a longitudinally extending central portion of a major side surface of the flexible strip of material and leaving longitudinally extending portions of the major side surface disposed on opposite sides of the central portion of the major side surface free of adhesive.

22. A method as set forth in claim 21 wherein said step of wrapping the tape around the plurality of conductors includes positioning the longitudinally extending portions of the major side surface which are free of adhesive in an overlapping relationship.

23. A method as set forth in claim 19 wherein said step of applying a layer of adhesive to the flexible strip of material includes applying the adhesive in a helical pattern which is spaced from longitudinally extending edge portions of the flexible strip.

24. A method as set forth in claim 23 wherein said step of wrapping the tape around the plurality of conductors includes positioning the longitudinally extending edge portions of the flexible strip in an overlapping relationship.

25. A method as set forth in claim 19 wherein said step of applying a layer of adhesive to the flexible strip of material includes applying the adhesive in a pattern which is spaced from longitudinally extending edge portions of the flexible strip.

26. A method as set forth in claim 19 further including the step of removing excess superabsorbent material from the tape.

27. A method as set forth in claim 19 further including the step of wrapping the tape and plurality of conductors in a sheath of water impervious material.

28. A method as set forth in claim 19 further including the step of applying suction to the superabsorbent material on the tape to remove excess superabsorbent material from the tape.

29. A method as set forth in claim 19 wherein said step of wrapping the tape around the plurality of conductors includes applying pressure against the tape to press the superabsorbent material against at least some of the conductors of the plurality of conductors.

30. A method of forming a cable containing a plurality of conductors, said method comprising the steps of applying a sealing material to the plurality of conductors, applying a layer of sealing material to a flexible strip of material to form a tape, applying a layer of superabsorbent material to the tape, said step of applying a layer of superabsorbent material to the tape including applying the layer of superabsorbent material to the layer of sealing material on the flexible strip of material, and wrapping the tape around the plurality of conductors with the sealing material on the conductors and with the superabsorbent material on the tape.

31. A method as set forth in claim 30 wherein said step of applying a layer of sealing material to the flexible strip of material includes applying the sealing material in a helical pattern which is spaced from longitudinally extending edge portions of the flexible strip.

32. A method as set forth in claim 31 wherein said step of wrapping the tape around the plurality of conductors includes positioning the longitudinally extending edge portions of the flexible strip in an overlapping relationship.

33. A method as set forth in claim 30 further including the step of removing excess superabsorbent material from the layer of sealing material on the flexible strip of material before performing said step of wrapping the tape around the plurality of conductors.

34. A method as set forth in claim 30 further including the step of applying suction to the superabsorbent material on the layer of sealing material to remove excess superabsorbent material from the layer of sealing material.

35. A method as set forth in claim 30 wherein said step of applying a layer of sealing material to the flexible strip of material includes applying sealing material to a longitudinally extending central portion of a major side surface of the flexible strip of material and leaving longitudinally extending portions of the major side surface disposed on opposite sides of the central portion of the major side surface free of sealing material.

36. A method as set forth in claim 30 wherein said step of wrapping the tape around the plurality of conductors includes positioning the longitudinally extending portions of the major side surface which are free of adhesive in an overlapping relationship.

37. A method as set forth in claim 30 wherein said step of wrapping the tape around the plurality of conductors includes engaging at least some of the sealing material applied to the plurality of conductors with the superabsorbent material on the tape.

38. A cable comprising a plurality of conductors, a tape wrapped around the plurality of conductors, said tape including a layer of adhesive disposed on a flexible strip, and a layer of superabsorbent material disposed between the tape and the plurality of conductors, said layer of superabsorbent material having a first side which is disposed in engagement with the layer of adhesive to interconnect the layer of superabsorbent material and said flexible strip.

39. A cable as set forth in claim 38 wherein said layer of superabsorbent material is formed by a powder which engages at least some of the conductors of said plurality of conductors.

40. A cable as set forth in claim 38 wherein said plurality of conductors are fiber optic conductors.

41. A cable as set forth in claim 38 wherein said layer of adhesive is disposed on a central portion of the flexible strip with longitudinally extending edge portions of the flexible strip free of adhesive, said longitudinally extending edge portions of the flexible strip being disposed in an overlapping relationship.

42. A method of forming a cable containing a plurality of conductors, said method comprising the steps of applying a layer of adhesive to a flexible strip of material with the adhesive spaced from opposite longitudinally extending edge portions of the flexible strip of material so that the opposite longitudinally extending edge portions of the flexible strip of material are free of adhesive, applying a layer of superabsorbent powder to the layer of adhesive, wrapping the flexible strip of material around the plurality of conductors with the longitudinally extending and adhesive free edge portions of the flexible strip of material in an overlapping relationship, and applying a sheath of water impervious material over the flexible strip of material.

43. A method as set forth in claim 42 wherein said step of applying a layer of adhesive to a flexible strip of material includes applying the adhesive to the flexible strip of material in a helical pattern which is spaced from the longitudinally extending edge portions of the flexible strip of material.

44. A method as set forth in claim 42 further including the step of applying a layer of sealant to the conductors prior to performing said step of wrapping the flexible strip of material around the plurality of conductors.

45. A method as set forth in claim 42 further including the step of removing excess superabsorbent powder from the layer of adhesive before performing said step of wrapping the flexible strip of material around the plurality of conductors, said step of removing excess superabsorbent powder from the layer of adhesive including the step of applying suction to the layer of superabsorbent powder.

* * * * *